United States Patent
Lee et al.

(10) Patent No.: US 8,452,270 B2
(45) Date of Patent: May 28, 2013

(54) MOBILE COMMUNICATION TERMINAL PROVIDING RING BACK TONE

(75) Inventors: Yang-Un Lee, Suwon-si (KR); Chul-Yong Jeon, Yongin-si (KR)

(73) Assignee: Samsung Electronics Co., Ltd (KR)

( * ) Notice: Subject to any disclaimer, the term of this patent is extended or adjusted under 35 U.S.C. 154(b) by 853 days.

(21) Appl. No.: 11/928,711

(22) Filed: Oct. 30, 2007

(65) Prior Publication Data

US 2008/0102782 A1    May 1, 2008

(30) Foreign Application Priority Data

Oct. 31, 2006 (KR) .................. 10-2006-0106253

(51) Int. Cl.
*H04L 29/08* (2006.01)

(52) U.S. Cl.
USPC ............ 455/414.4; 455/414.1; 455/550.1; 455/567; 379/88.13; 379/88.16; 704/275; 704/270

(58) Field of Classification Search
USPC ....... 704/278, 258, 271, 275, 270; 379/93.23, 379/52, 101.01, 106.01, 88.13, 88.16; 455/414.4, 414.1, 550.1, 567, 466
See application file for complete search history.

(56) References Cited

U.S. PATENT DOCUMENTS

| | | | |
|---|---|---|---|
| 6,466,909 B1 * | 10/2002 | Didcock | 704/260 |
| 6,618,600 B1 * | 9/2003 | Chow et al. | 455/567 |
| 6,647,272 B1 * | 11/2003 | Asikainen | 455/466 |
| 6,735,286 B1 * | 5/2004 | Hansen et al. | 379/52 |
| 6,738,742 B2 * | 5/2004 | Badt et al. | 704/270 |
| 6,901,139 B2 * | 5/2005 | Gonzalez et al. | 379/207.16 |
| 6,931,376 B2 * | 8/2005 | Lipe et al. | 704/270.1 |
| 7,650,170 B2 * | 1/2010 | May et al. | 455/569.2 |
| 2002/0034956 A1 * | 3/2002 | Mekuria | 455/466 |
| 2004/0081305 A1 * | 4/2004 | Gonzalez et al. | 379/207.16 |
| 2005/0119890 A1 * | 6/2005 | Hirose | 704/260 |
| 2006/0088281 A1 * | 4/2006 | Hasegawa | 386/46 |
| 2006/0210033 A1 * | 9/2006 | Grech et al. | 379/88.19 |
| 2007/0189488 A1 * | 8/2007 | Stoops | 379/207.16 |
| 2007/0189504 A1 * | 8/2007 | Silver et al. | 379/373.02 |
| 2008/0161057 A1 * | 7/2008 | Nurminen et al. | 455/563 |

FOREIGN PATENT DOCUMENTS

| | | |
|---|---|---|
| KR | 1020040042221 | 5/2004 |
| KR | 1020060068153 | 6/2006 |

* cited by examiner

*Primary Examiner* — Allahyar Kasraian
(74) *Attorney, Agent, or Firm* — The Farrell Law Firm, P.C.

(57) ABSTRACT

Provided are an apparatus and a method for providing a ring back tone in a mobile communication terminal. Character information is received through a wireless data communication or generated through a user input. The character information is transformed into voice using a text-to-speech transformer and then provided as a ring back tone.

17 Claims, 4 Drawing Sheets

MOBILE COMMUNICATION TERMINAL PROVIDING RING BACK TONE

PRIORITY

This application claims priority under 35 U.S.C. §119 to an application filed in the Korean Intellectual Property Office on Oct. 31, 2006 and assigned Serial No. 2006-0106253, the contents of which are incorporated herein by reference.

BACKGROUND OF THE INVENTION

1. Field of the Invention

The present invention relates generally to a mobile communication terminal, and in particular, to an apparatus and a method for providing a ring back tone in a mobile communication terminal.

2. Description of the Related Art

FIG. 1 is a flowchart of a method of providing a ring back tone in a conventional mobile communication terminal. Referring to FIG. 1, in step 100, a user sends a telephone call to a called party. In step 110, a ring back tone is provided. In step 120, a determination is made as to whether the called party has answered the telephone call. If it is determined in step 120 that the called party has answered the telephone call, the ring back tone stops in step 130. In step 140, the telephone call is connected to the called party.

If a caller makes a telephone call to a called party, a ring back time generally lasts between 30 seconds and 50 seconds until the called party answers the telephone call. The caller hears a generic dial tone or music designated by the called party as a ring back tone at ring back time as the time required until the called party answers the telephone call. Such a ring back tone is generally called coloring.

The caller does not know when the called party answers the telephone call and thus hears the ring back tone to wait unit the called party answers the telephone call.

Although it depends on each caller, a caller generally sends several or tens of telephone calls a day and thus must boringly wait for and waste a ring back time.

Also, with the development of wireless data communication services, mobile communication terminals can frequently update and receive various types of new information such as latest news, weather information, stock information, etc. Nevertheless, the various types of new information have character information formats. Thus, there is no method of efficiently accessing various types of new information during a ring back time.

SUMMARY OF THE INVENTION

An aspect of the present invention is to substantially solve at least the above problems and/or disadvantages and to provide at least the advantages below. Accordingly, an aspect of the present invention is to provide a mobile communication terminal providing a user with new information as a ring back tone using a Text-To-Speech (TTS) transformer.

According to one aspect of the present invention, there is provided a mobile communication terminal providing a ring back tone, including a memory storing character information; a TTS transformer transforming the character information into voice; and a controller controlling the TTS transformer to transform the character information stored in the memory into voice so as to provide the character information as the ring back tone.

According to another aspect of the present invention, there is provided a method of providing a ring back tone in a mobile communication terminal, including storing character information in a memory; transforming at least one or more pieces of the character information into voice using a TTS transformer; and providing the voice as a ring back tone.

BRIEF DESCRIPTION OF THE DRAWINGS

The above and other aspects, features and advantages of the present invention will become more apparent from the following detailed description when taken in conjunction with the accompanying drawings in which.

DETAILED DESCRIPTION OF THE PREFERRED EMBODIMENTS

Preferred embodiments of the present invention will be described herein below with reference to the accompanying drawings. In the following description, well-known functions or constructions are not described in detail since they would obscure the invention in unnecessary detail.

Figure 1:
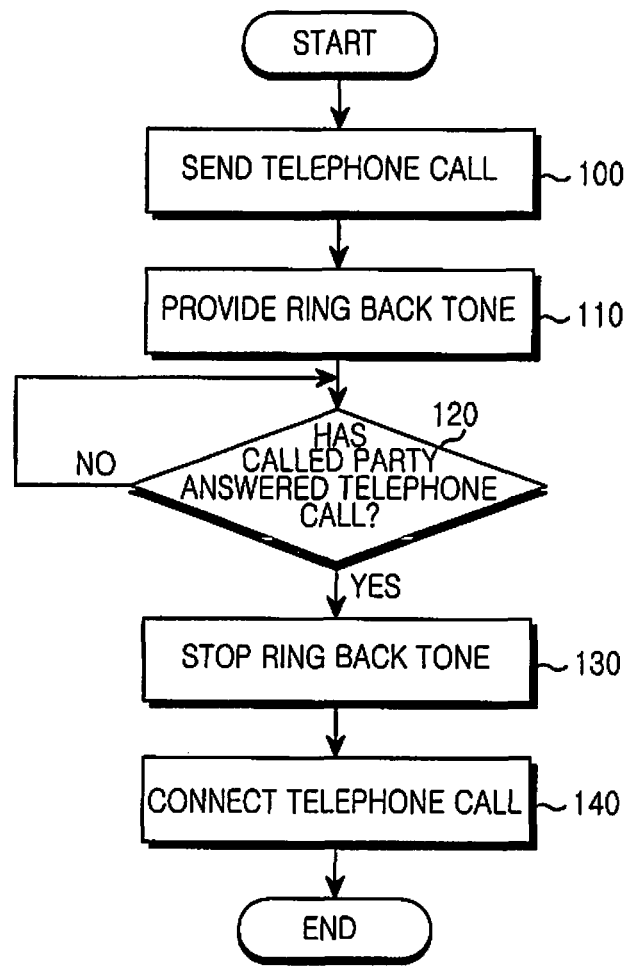
FIG. 1 is a flowchart of a method of providing a ring back tone in a conventional mobile communication terminal.
Figure 2:
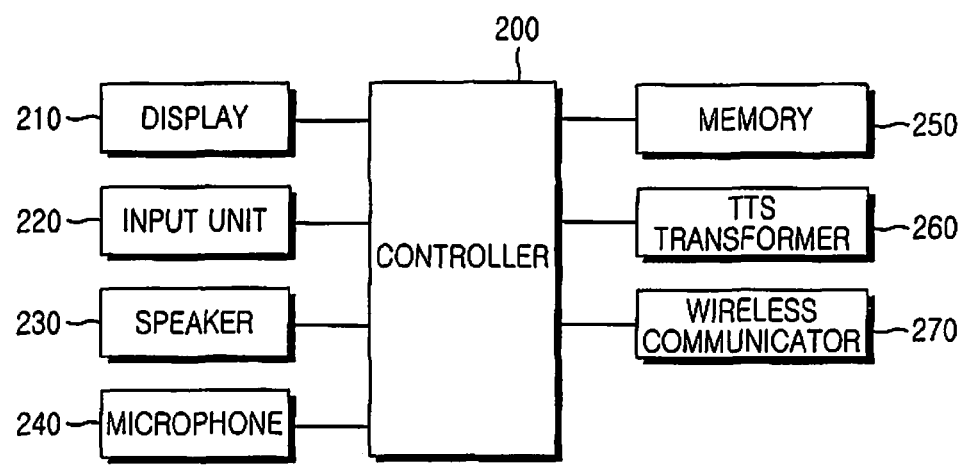
FIG. 2 is a block diagram of a mobile communication terminal according to the present invention.

Referring to FIG. 2, the present invention provides a mobile communication terminal which frequently stores news, weather information, stock information, etc. received through wireless data communications in a memory, transforms character information into speech to be provided as a ring back tone during ring back time through a Text-To-Speech (TTS) transformer 260, and provides the speech as the ring back tone. A user may select desired character information of random character information displayed on a display 210 of the mobile communication terminal to hear the desired character information in speech as a ring back tone until a called party answers a telephone call.

The mobile communication terminal includes components as shown in FIG. 2 to realize functions as described above. Referring to FIG. 2, the mobile communication terminal includes the display 210, an input unit 220, a speaker 230, and a microphone 240. The display 210 displays several types of information.

The mobile communication terminal further includes a memory 250 which stores various types of information including news, weather information, stock information, music, moving pictures, etc. In detail, the memory 250 may be an external memory such as a buffer, a Read Only Memory (ROM), a Random Access Memory (RAM), a hard disc, or a Secure Digital (SD) card, a flash memory, or the like.

The TTS transformer 260 is an important unit of the present invention which transforms character information into speech. The TTS transformer 260 is mainly used to transform a Short Message Service (SMS) message received from a mobile communication terminal into speech and provide the speech to a user.

A wireless communicator 270 refers to a unit which is used for existing voice communications and wireless data communications, i.e., wireless communications in various wireless communication protocol networks such as Code Division Multiple Access (CDMA), Global System for Mobile Communications (GSM), Wideband CDMA (WCDMA) networks, etc. The mobile communication terminal of the present preferred embodiment can perform wireless voice and data communications through the wireless communicator 270 to receive various types of character information including news, weather information, stock information, etc.

A "Naver Popup" service provided in a domestic wireless communication network may be taken as an example. The "Naver Popup" service is to update and provide various types of information including news, etc. on a standby screen of a display of a mobile communication terminal.

A controller 200 has various control functions in the mobile communication terminal. In particular, according to the present preferred embodiment, the controller 200 may determine character information to be provided as a ring back tone, transform the character information into voice using the TTS transformer 260, and provide the voice as the ring back tone of the mobile communication terminal.

Figure 3:
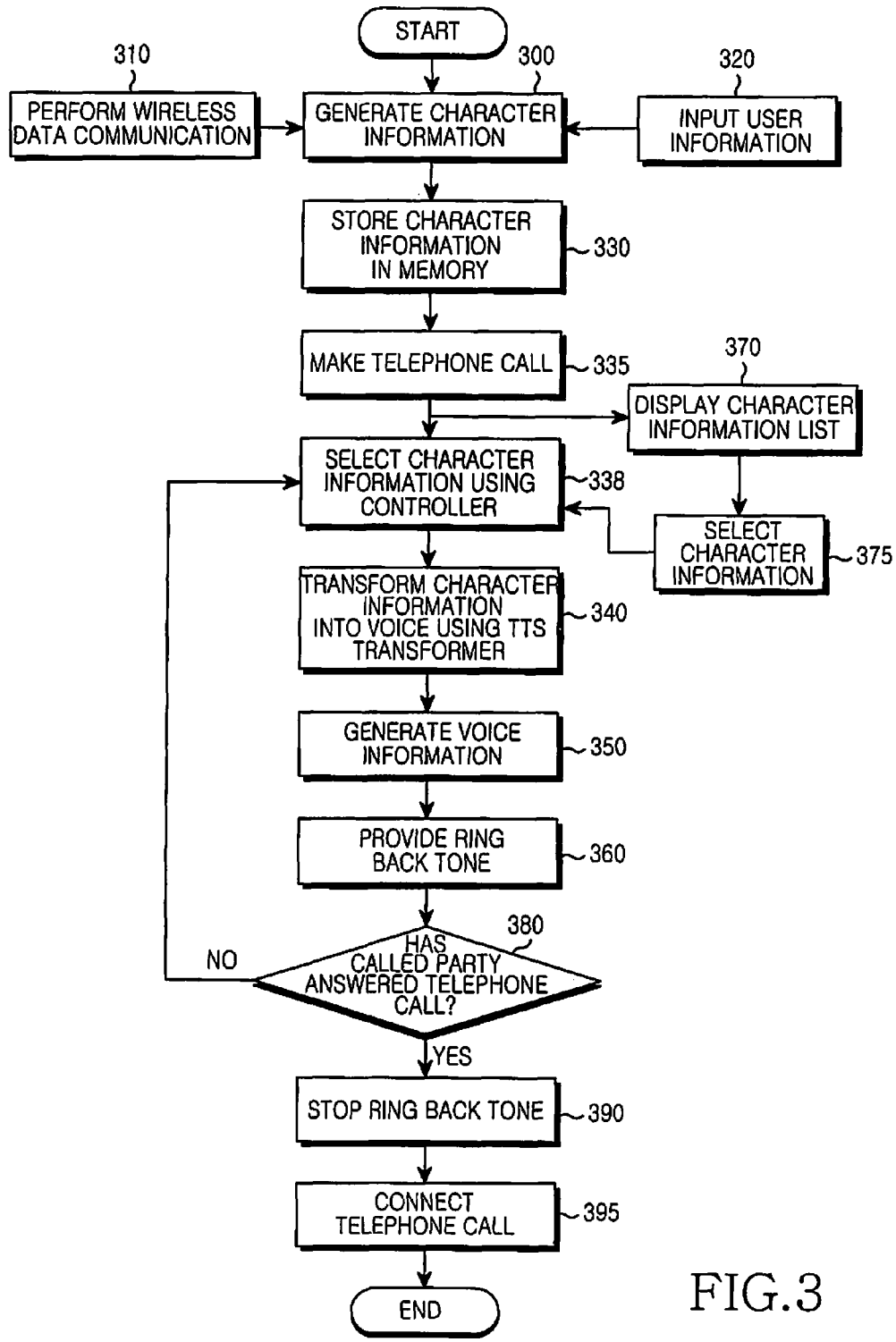
FIG. 3 is a flowchart of a method of providing a ring back tone in a mobile communication terminal according to the present invention.

FIG. 3 is a flowchart of a method of providing a ring back tone in a mobile communication terminal according to the present invention. Referring to FIG. 3, in step 310, the mobile communication terminal performs a wireless data communication in a power-on state to receive character information including news, weather information, stock information, etc. In step 320, the mobile communication terminal receives personal schedule information or personal memorandum information from a user. Thus, in step 300, the mobile communication terminal generates character information to be provided as a ring back tone.

In step 330, the mobile communication terminal stores and frequently updates the generated character information in the memory 250. The user may set first character information to be provided as a ring back tone to a default value during ring back time and store the set default value together with the character information in the memory 250. For example, if news is set to the default ring back tone, frequently received and updated news information is first transformed into and provided as a ring back tone.

In step 335, the user dials to make a telephone call. In step 338, the controller 200 selects character information for the set default ring back tone. In step 340, the TTS transformer 260 transforms the character information into voice information, and then the voice information is generated in step 350. In step 360, the voice information is provided in speech to the user, who is waiting for an answer to the telephone call from a called party, through the speaker 230 of the mobile communication terminal.

If the user has not designated specific character information for a default ring back tone, in step 338, the controller 200 may set most recently received character information to character information to be first provided through the wireless data communication and provide the character information to the TTS transformer 260.

In step 370, the mobile communication terminal displays the character information generated in step 300 as a list on the display 210. In step 375, the user selects character information through the input unit 220 and provides the selected character information to the controller 200 to provide the selected character information as a ring back tone. If the user does not select character information in step 375, a default ring back tone or character information selected by the controller 200 may be provided as a ring back tone.

The user may selectively hear a ring back tone until a called party answers a telephone call as described above and thus may be provided with various types of information including news, weather information, stock information, etc.

In step 380, a determination is made as to whether the called party has answered the telephone call. If it is determined in step 380 that the called party has answered the telephone call, the ring back tone stops in step 390. In step 395, the telephone call is connected to the called party.

Figure 4:
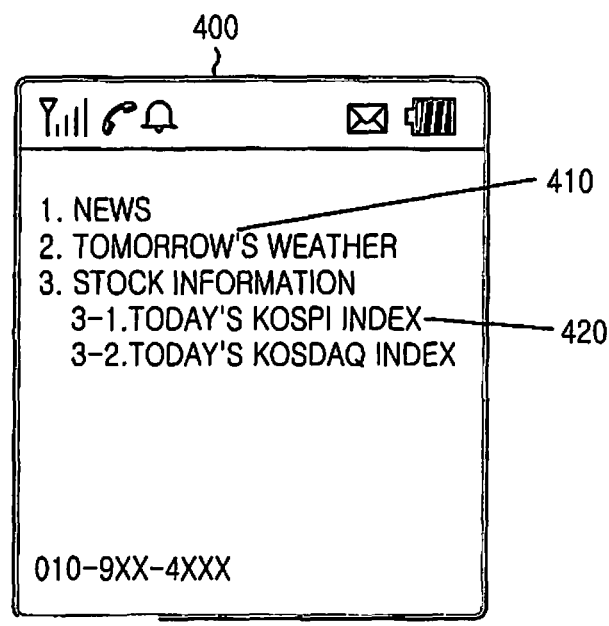
FIG. 4 illustrates character information and itemized character information which is displayed and selected as a ring back tone on a display of a mobile communication terminal, according to the present invention.

FIG. 4 illustrates an example of a list of character information to be provided as a ring back tone displayed on the display 210 of the mobile communication terminal as described in step 370 of FIG. 3.

Referring to FIG. 4, character information 410 may be character information received through a wireless data communication or personal schedule information directly input by a user.

The character information 410 may include a plurality of pieces of itemized character information 420 which may be updated through a wireless data communication or a user input.

If the user presses a keypad button "3" to select "Stock Information," "Today's KOSPI Index," first itemized character information, is transformed into voice and provided as a ring back tone. Subsequently to the first itemized character information, "Today's KOSDAQ Index," second itemized character information, is provided as a ring back tone. Alternatively, the user may select at least one of the plurality of pieces of itemized character information 420 and immediately provide the selected piece of itemized character information as a ring back tone.

In accordance with the present invention as described above, a mobile communication terminal can transform character information, which is received through a wireless data communication or generated by a user, into voice. Thus, the mobile communication terminal can provide the user with useful character information as voice at a ring back time required until a called party answers a telephone call. As a result, the user can access character information during ring back time.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A mobile communication terminal providing a ring back tone, comprising:
   a memory, in the mobile communication terminal, storing character information;
   a Text-To-Speech (TTS) transformer, in the mobile communication terminal, transforming the stored character information into a voice; and
   a controller, in the mobile communication terminal, controlling the TTS transformer so as to output the voice as the ring back tone when the mobile communication terminal originates a call,
   wherein the character information comprises most recently received character information.

2. The mobile communication terminal of claim 1, wherein the character information is received through a wireless data communication.

3. The mobile communication terminal of claim 1, wherein the character information is written by a user through an input unit.

4. The mobile communication terminal of claim 1, further comprising:
   a display displaying the character information; and
   an input unit allowing a user to select the displayed character information.

5. The mobile communication terminal of claim 4, wherein when the user selects a random piece of the displayed character information, the controller provides the selected random piece as the ring back tone.

6. The mobile communication terminal of claim 1, wherein when the mobile communication terminal as a receiver receives a new telephone call, the controller stops the ring back tone and connects the new telephone call.

7. A method of providing a ring back tone in a mobile communication terminal, comprising:
   storing, by the mobile communication terminal, character information in a memory;
   transforming, by the mobile communication terminal, at least one piece of the stored character information into a voice using a TTS (Text-To-Speech) transformer; and
   outputting, by the mobile communication terminal, the voice as the ring back tone when the mobile communication terminal originates a call,
   wherein the character information comprises most recently received character information.

8. The method of claim 7, further comprising presetting a first piece of the character information to be provided as the ring back tone.

9. The method of claim 7, further comprising:
   displaying the character information on a display during ring back time; and
   allowing a user to select at least one piece of the displayed character information as the ring back tone.

10. The method of claim 9, wherein when the selected at least one piece of the displayed character information comprises a plurality of pieces of itemized character information arranged in a predetermined order, the pieces of itemized character information are provided as ring back tones sequentially in the predetermined order.

11. The method of claim 7, wherein the character information comprises itemized character information.

12. The method of claim 11, wherein the character information and the itemized character information are frequently updated through a wireless data communication.

13. The method of claim 11, wherein the character information and the itemized character information are written by a user through an input unit.

14. The method of claim 11, further comprising:
   displaying the character information and the itemized character information on a display; and
   allowing a user to select at least one piece of the itemized character information as the ring back tone.

15. The method of claim 7, further comprising, when the mobile communication terminal as a receiver receives a new telephone call, stopping the ring back tone and connecting the new telephone call.

16. The mobile communication terminal of claim 1, wherein
   the character information comprises text included in a Short Message Service (SMS) message received from another mobile communication terminal by the mobile communication terminal.

17. The method of claim 7, wherein
   the character information comprises text included in a Short Message Service (SMS) message received from another mobile communication terminal by the mobile communication terminal.

* * * * *